(12) United States Patent
Rhein et al.

(10) Patent No.: US 10,541,528 B2
(45) Date of Patent: *Jan. 21, 2020

(54) WHIP AND LOOP INTERRUPTER COMBINATION

(71) Applicant: Hubbell Incorporated, Shelton, CT (US)

(72) Inventors: David Rhein, Saint Jacob, IL (US); Nathan Scot Loucks, Highland, IL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,590

(22) Filed: Nov. 28, 2018

(65) Prior Publication Data

US 2019/0097414 A1 Mar. 28, 2019

Related U.S. Application Data

(63) Continuation of application No. 15/584,903, filed on May 2, 2017, now Pat. No. 10,148,081.

(60) Provisional application No. 62/330,550, filed on May 2, 2016.

(51) Int. Cl.
| | | |
|---|---|---|
| *H01H 9/14* | (2006.01) |
| *H02H 3/20* | (2006.01) |
| *H01H 33/12* | (2006.01) |
| *H01H 3/30* | (2006.01) |
| *H01H 33/02* | (2006.01) |
| *H01H 33/04* | (2006.01) |
| *H01H 71/12* | (2006.01) |
| *H02H 3/38* | (2006.01) |

(52) U.S. Cl.
CPC ........... *H02H 3/205* (2013.01); *H01H 3/3042* (2013.01); *H01H 9/14* (2013.01); *H01H 33/02* (2013.01); *H01H 33/04* (2013.01); *H01H 33/126* (2013.01); *H01H 71/12* (2013.01); *H02H 3/38* (2013.01)

(58) Field of Classification Search
CPC ........ H02H 3/205; H02H 3/38; H01H 3/3042; H01H 9/14; H01H 33/04; H01H 71/12; H01H 33/126; H01H 33/02
See application file for complete search history.

(56) References Cited

U.S. PATENT DOCUMENTS

| | | | |
|---|---|---|---|
| 2,849,578 A | 8/1958 | Hart | |
| 2,953,655 A | 9/1960 | Warner, Jr. | |
| 2,955,181 A * | 10/1960 | Luehring | H01H 33/126 218/10 |
| 3,027,439 A * | 3/1962 | Beach | H01H 3/30 218/84 |
| 3,032,632 A | 5/1962 | Beach | |

(Continued)

OTHER PUBLICATIONS

Load and Line Switcher by Southern States. Product Page. Apr. 29, 2013 (5 pages).

(Continued)

*Primary Examiner* — Truc T Nguyen
(74) *Attorney, Agent, or Firm* — Michael Best & Friedrich, LLP

(57) ABSTRACT

A circuit interrupting device including a loop split interrupter for interrupting a loop split circuit, and a quick whip interrupter for interrupting a charging circuit.

12 Claims, 3 Drawing Sheets

(56) References Cited

U.S. PATENT DOCUMENTS

| | | | | |
|---|---|---|---|---|
| 3,070,680 | A | * | 12/1962 | McBride ............... H01H 31/28 218/9 |
| 3,171,004 | A | * | 2/1965 | Luehring ............... H01H 31/28 218/8 |
| 3,217,115 | A | | 11/1965 | Kaplan |
| 3,488,752 | A | | 1/1970 | Burton |
| 3,602,668 | A | * | 8/1971 | Krajewski ............ H01H 33/124 218/10 |
| 3,697,712 | A | * | 10/1972 | Chabala ................ H01H 31/02 218/12 |
| 4,243,854 | A | | 1/1981 | Pahl |
| 5,369,234 | A | | 11/1994 | Demissy |
| 6,392,181 | B1 | | 5/2002 | Cleaveland |
| 2004/0173576 | A1 | | 9/2004 | Kowalik |
| 2015/0243459 | A1 | | 8/2015 | Rhein |
| 2017/0110273 | A1 | | 4/2017 | Rhein et al. |

OTHER PUBLICATIONS

PCT/US2017/030633 International Search Report and Written Opinion dated Jul. 21, 2017 (10 pages).

\* cited by examiner

WHIP AND LOOP INTERRUPTER COMBINATION

CROSS REFERENCE TO RELATED APPLICATIONS

This application claims the benefit of U.S. patent application Ser. No. 15/584,903, filed on May 2, 2017, which claims the benefit of U.S. Provisional Patent Application No. 62/330,550, filed May 2, 2016, both of which are incorporated herein by reference.

FIELD

Embodiments relate to current interrupting devices.

SUMMARY

Electrical switching equipment—also referred to as switchgear—closes and opens an electrical circuit. This action necessarily requires a change of state of the circuit from one steady-state condition to another. The change is related to the change of the energy in the circuit components which, in turn, produces an electrical transient, which comes in the form of a surge voltage, a surge current or both. Such transients include energy that must be safely dissipated to avoid severe injury or death.

Depending on the circuit conditions, however, even small amounts of transient energy can be sufficient enough to damage or destroy other nearby equipment. It is the function of the switchgear to provide the circuit switching functions without generating transient levels that cannot be safely managed by the system components.

High voltage/high current interrupter switches typically include either a bottle interrupter or a whip. The bottle interrupter has one or more bottles, e.g., with loop split ratings, and the whip has line charging ratings.

Providing both functions for separate situations is costly and requires excessive equipment and maintenance. A device known as a Teco-Rutper™, provided by Turner Electric, performs both functions but it requires a multi-bottle stack. An exemplary device disclosed herein does both at a much lower cost because according to one or more embodiments of the device disclosed, there is only one bottle. A need exists, therefore, for a combined single-bottle solution to reduce the amount of equipment required and provide a more cost-effective solution.

Thus, in one embodiment, a circuit interrupting device includes a loop split interrupter for interrupting a loop split circuit with a high current and a low voltage and a quick whip interrupter for interrupting a charging circuit with a low current and high voltage. In some embodiments, a circuit interrupting device includes a blade carrying a primary current for said circuit and a pickup assembly bridging the current from said blade to one or more loop split interrupter and quick whip interrupter.

In another embodiment, a circuit interrupting device includes a spark gap disposed between two or more spark gap rods. In some embodiments, a circuit interrupter includes a single bottle interrupter.

BRIEF DESCRIPTION OF THE DRAWINGS

A more complete understanding of the present application may be derived by referring to the detailed description and claims when considered in connection with the Figures, wherein like reference numerals refer to similar elements throughout the Figures.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
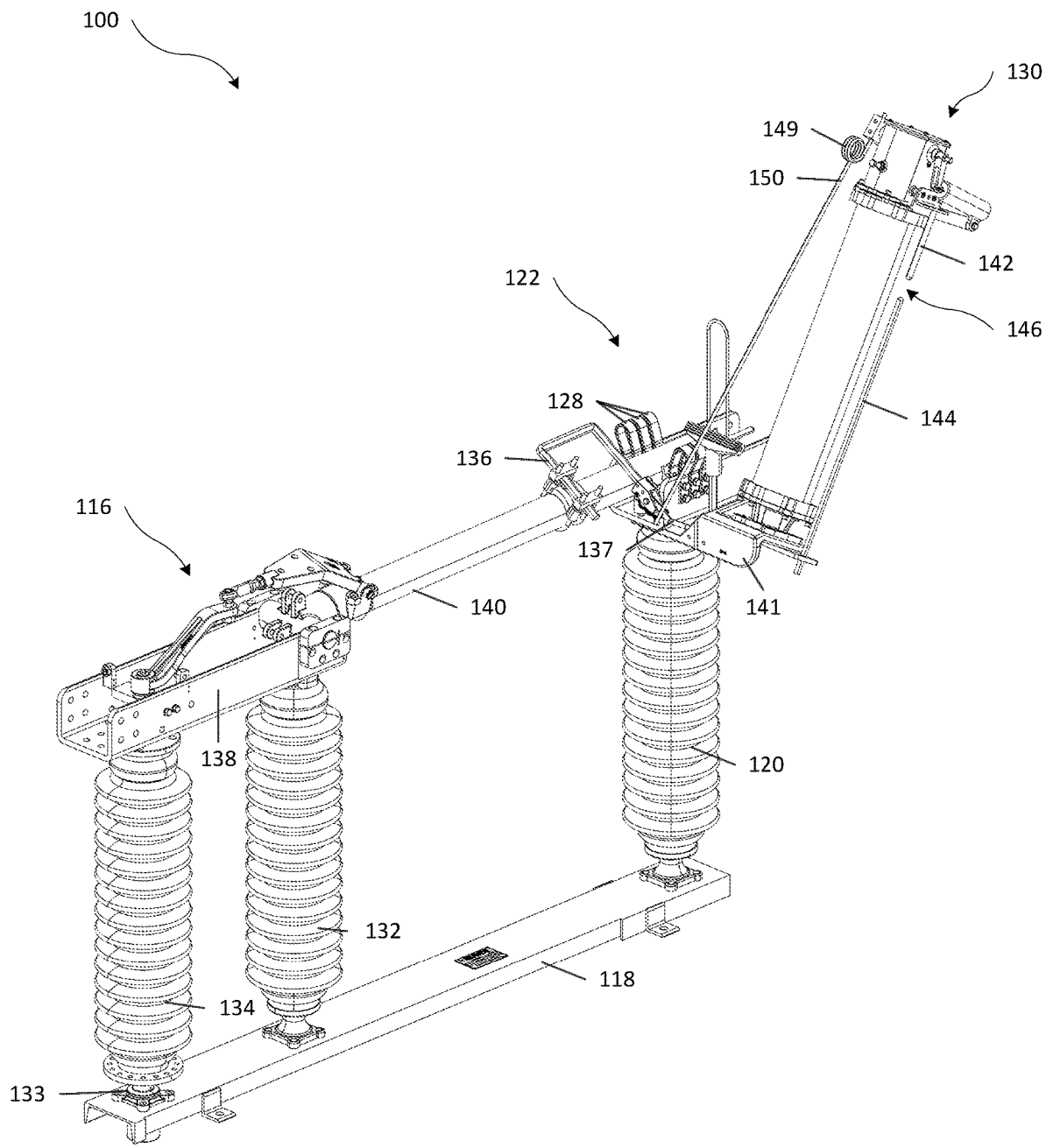
FIG. 1 illustrates an exemplary high voltage/high current circuit interrupter switch in a closed position according to one embodiment.

With reference now to FIG. 1, a high voltage/high current circuit interrupter switch 100 according to one embodiment includes a support frame 118. A first elongate insulator 120, mounted to support frame 118, supports a terminal support 141. A first electrical terminal 122 is connected to terminal support 141. A loop split interrupter 130 is connected to terminal support 141, which also provides electrical conductivity between electrical terminal 122 and a distal end of loop split interrupter 130. A first spark rod 144 is also connected to terminal support 141. A second spark rod is connected to an operational end of loop split interrupter 130, separated from the first spark rod 144 by spark gap 146. Loop split interrupter 130 is configured for interrupting loop split circuits. Loop split interrupter 130 may include a plurality of vacuum bottles, or may be configured with a single vacuum bottle. Quick whip 150 is connected to the operational end of loop split interrupter 130. In some embodiments, quick whip 150 includes a mechanical energy storage mechanism, such as torsion spring 149. In some embodiments, the operational end of loop split interrupter 130 is also connected to a first transmission wire (not shown).

Regarding the pivotable switch components, the support frame 118 may also mount a second elongated insulator 132 and third elongate insulator 134 opposite the first insulator 120. The third insulator 134 may be pivotably connected to the support frame 118, for example, via a bearing assembly 133. In some embodiments, support frame 118 is then connected to a second transmission wire (not shown). Furthermore, the third insulator 134 also connects to the operating mechanism 116 and is pivoted thereby as described in further detail below. The second insulator 132 and third insulator 134 mount a blade support 138 and an electrically conductive tubular blade 140 that is pivotable to selectively provide an electrical connection with the first electrical terminal 122. Pickup finger assembly 136 is attached to blade 140 and configured such that it maintains electrical contact with quick whip 150 over a portion of travel of blade 140. Whip catch 137 guides movement of whip 150 and limits displacement of whip 150 perpendicular to the movement plane of blade 140.

In some embodiments, rotating the operating mechanism 116 pivots the blade 140 from a closed blade position (FIG. 1) through an intermediary position (FIG. 2) to an open position (FIG. 3) and vice versa. Specifically, pivoting the operating mechanism 116 in a first direction (for example, clockwise as viewed from above in the illustrated embodiment) drives the blade 140 toward the closed blade position, and pivoting the operating mechanism 116 in a second direction (for example, counter-clockwise as viewed from above in the illustrated embodiment) drives the blade 140 toward the open blade position.

Figure 2:
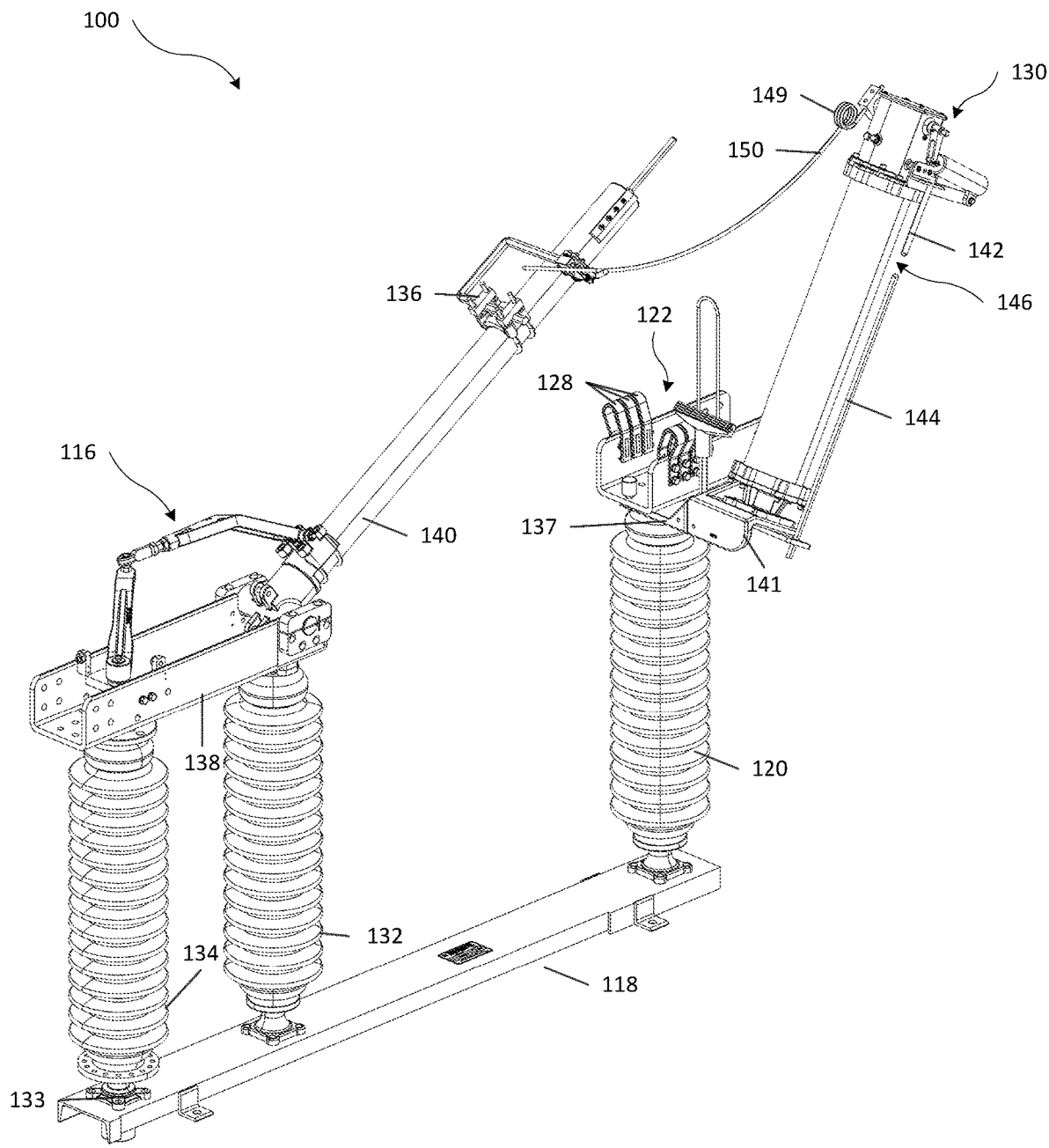
FIG. 2 illustrates an exemplary high voltage/high current circuit interrupter switch in a intermediary position according to one embodiment.
Figure 3:
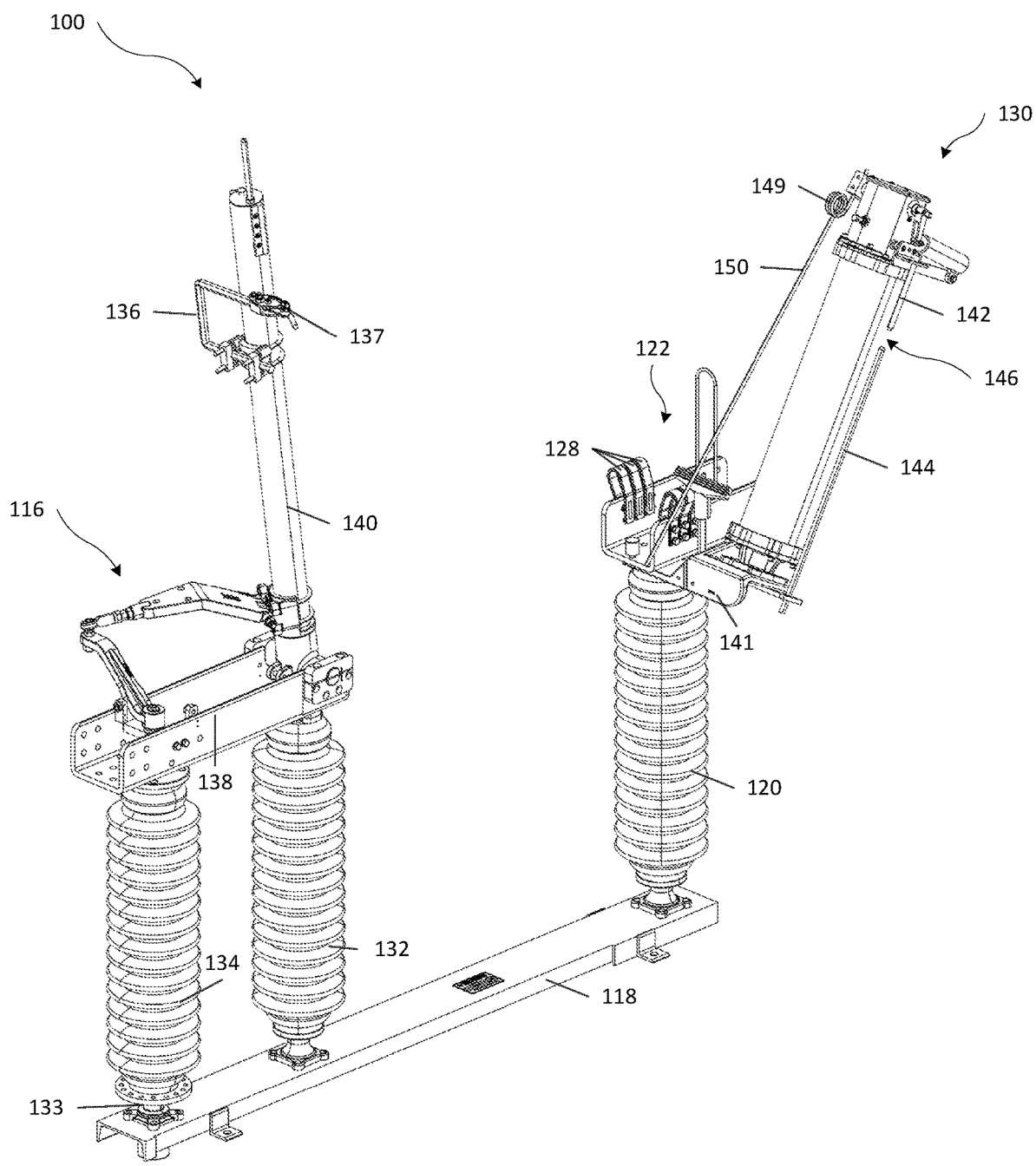
FIG. 3 illustrates an exemplary high voltage/high current circuit interrupter switch in an open position according to one embodiment.

The blade support 138 mounts the blade 140 such that the blade 140 is pivotable about its lateral axis from a closed contact position (FIG. 1) to an open contact position (the blade 140 is shown moving toward the open contact position in FIG. 2) and vice versa. As the name implies, in the closed contact position the blade 140 proximate the first electrical terminal 122 engages the terminal contacts 128 to electrically connect the first terminal 122 and the blade 140. In some embodiments, when electrically connected, blade 140 connects the first and second transmission wires.

An exemplary operation of circuit interrupter 100 will follow. While in the closed position, the first and second transmission wires are electrically connected. Rotating operating mechanism 116 pivots blade 140 from a closed position. As blade 140 pivots, whip catch 137 contacts whip 150. The electrically conductive path is now through whip catch 137 to whip 150 and loop split interrupter 130. As blade 140 continues to pivot, whip catch 137 loads whip 150. While whip 150 is being loaded, interrupter 130 attempts to interrupt the circuit. If the circuit is a loop split scenario (for example, both transmission lines are at approximately equal voltages), interrupter 130 interrupts the circuit. If the circuit is a line charging scenario (for example, one of the transmission lines is unloaded), the high recovery voltage causes the air in spark gap 146 to break down and conduct current through spark rods 142-144. Current may continue to flow through whip 150 into blade 140 until blade 140 pivots beyond the extent of whip 150. Once whip catch 137 releases whip 150, whip 150 rapidly unloads tension stored in torsion spring 149, interrupting the circuit.

The switch 100 may comprise appropriate materials recognized by those skilled in the art. For example, the blade 140 may be formed of aluminum and the terminals 122 and 100 and the blade support 138 may be formed of copper, silver-coated metals, or the like. The insulators 120, 132, and 134 may be formed of ceramics or other insulating materials.

Finally, while the present application has been described above with reference to various exemplary embodiments, many changes, combinations and modifications may be made to the exemplary embodiments without departing from the scope of the present application. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present application.

Preferred embodiments of the application have been described in considerable detail. Many modifications and variations to the preferred embodiments described will be apparent to a person of ordinary skill in the art. Therefore, the application should not be limited to the embodiments described, but should be defined by the claims that follow.

What is claimed is:

1. A circuit interrupting device comprising:
   a loop split interrupter for interrupting a loop split circuit;
   a quick whip interrupter for interrupting a charging circuit;
   a primary circuit including the loop split circuit and the charging circuit;
   a blade carrying a primary current for the primary circuit;
   a pickup assembly bridging the current from said blade to one or more of said loop split interrupter and said quick whip interrupter; and
   wherein the loop split interrupter includes two or more spark gap rods, wherein a spark gap is disposed between the two or more spark cap rods.

2. The circuit interrupting device recited in claim 1, wherein primary circuit has a high current and a low voltage.

3. The circuit interrupting device recited in claim 1, wherein the blade is rotatable between a first position and a second position, wherein, in a first position, the blade conducts the primary current for the primary circuit and, in a second position, the blade does not conduct current for the primary circuit.

4. The circuit interrupting device recited in claim 1, wherein said loop split interrupter includes a single bottle interrupter.

5. The circuit interrupting device recited in claim 1, wherein the quick whip interrupter includes a mechanical energy storage mechanism.

6. The circuit interrupting device recited in claim 5, wherein the mechanical energy storage mechanism comprises a torsion spring.

7. An electrical switch, comprising:
   an electrical terminal including a terminal contact;
   a mop split interrupter electrically coupled to the terminal contact;
   a quick whip interrupter electrically coupled to the loop split interrupter and the terminal contact;
   a primary circuit including the loop split circuit and the charging circuit;
   a blade carrying a primary current for the primary circuit and rotatable from an open blade position to a closed blade position;
   a pickup assembly bridging the primary current from said blade to one or more of said loop split interrupter and said quick whip interrupter; and
   wherein the loop split interrupter includes two or more spark gap rods, wherein a spark gap is disposed between the two or more spark gap rods.

8. The electrical switch of claim 7, further comprising a pickup assembly bridging the current from the blade to one or more of the loop split interrupter and the quick whip interrupter.

9. The electrical switch of claim 7, wherein the loop split interrupter includes a single bottle interrupter.

10. The electrical switch of claim 7, wherein the blade conducts a current in the closed blade position and does not conduct a current in the open blade position.

11. The electrical switch of claim 7, wherein the quick whip interrupter includes a mechanical energy storage mechanism.

12. The electrical switch of claim 11, wherein the mechanical energy storage mechanism comprises a torsion spring.

* * * * *